(12) United States Patent
Haustein et al.

(10) Patent No.: US 7,416,075 B2
(45) Date of Patent: Aug. 26, 2008

(54) TELESCOPING CONVEYOR WITH POWERED AND STEERABLE DISCHARGE SECTION

(75) Inventors: Mark Haustein, Jonesboro, AR (US); Ryan Schaecher, Bono, AR (US)

(73) Assignee: Northstar Industries, Inc., Jonesboro, AR (US)

( * ) Notice: Subject to any disclaimer, the term of this patent is extended or adjusted under 35 U.S.C. 154(b) by 9 days.

(21) Appl. No.: 11/500,653

(22) Filed: Aug. 8, 2006

(65) Prior Publication Data

US 2008/0035453 A1 Feb. 14, 2008

(51) Int. Cl.
*B65G 15/60* (2006.01)
(52) U.S. Cl. .................................... 198/812; 198/588
(58) Field of Classification Search ............... 198/588, 198/594, 595, 314, 315, 812
See application file for complete search history.

(56) References Cited

U.S. PATENT DOCUMENTS

| | | | |
|---|---|---|---|
| 1,725,740 A | 8/1929 | Schulte | |
| 1,959,735 A | 5/1934 | Phillips | |
| 2,169,890 A * | 8/1939 | Zink | 198/313 |
| 2,479,823 A * | 8/1949 | Ernst | 198/312 |
| 2,576,217 A | 11/1951 | Eggleston | |
| 2,815,849 A | 12/1957 | Zumbrunnen | |
| 2,826,290 A | 3/1958 | Barski | |
| 2,915,165 A | 12/1959 | Bell | |
| 2,988,190 A | 6/1961 | Tucker | |
| 3,006,454 A | 10/1961 | Penn | |
| 3,216,552 A | 11/1965 | Lister, Jr. | |
| 3,242,342 A | 3/1966 | Gabar | |
| 3,294,216 A | 12/1966 | Girardi | |
| 3,596,785 A | 8/1971 | Weatherford | |
| 3,780,843 A | 12/1973 | McGovern, Jr. et al. | |
| 3,788,452 A | 1/1974 | McWilliams | |
| 3,876,060 A | 4/1975 | Stease | |
| 3,885,682 A | 5/1975 | McWilliams | |
| 3,993,204 A | 11/1976 | Hummel | |
| RE29,110 E * | 1/1977 | Oury | 198/314 |
| 4,179,023 A * | 12/1979 | Hacker et al. | 198/861.1 |

(Continued)

FOREIGN PATENT DOCUMENTS

SU 0372130 4/1969

(Continued)

*Primary Examiner*—Douglas A Hess
(74) *Attorney, Agent, or Firm*—Kilpatrick Stockton LLP

(57) ABSTRACT

Powered and steerable telescoping conveyors. The telescoping conveyors have an infeed section and a discharge section. The discharge section can be telescoped beneath the infeed section in a retracted position. In an extended position, containers can be conveyed over first and second conveying structures that are located on the infeed and discharge sections, respectfully. The conveying structures can include wheels, rollers, or belts. A power module can move the discharge section between the extended and retracted positions. The power module can be located at various positions along the conveyor, including at a discharge end of the discharge section. A steering assembly can be provided to orient the discharge section with respect to the infeed section. The steering assembly can include two wheels, each wheel having its own independent wheel-steering axis. A power module can be associated with each of the independent wheels. The conveyor can be provided with guide rails and guide pins to align the discharge and infeed sections. There can be a bumper bar to brake the conveyor if the conveyor contacts an immovable object. The entire conveyor can be portable.

20 Claims, 13 Drawing Sheets

U.S. PATENT DOCUMENTS

| | | | |
|---|---|---|---|
| 4,260,053 A | 4/1981 | Onodera | |
| 4,425,069 A | 1/1984 | Saur et al. | |
| 4,538,722 A * | 9/1985 | Sumner | 198/861.2 |
| 4,852,712 A | 8/1989 | Best | |
| 5,042,644 A | 8/1991 | Davis | |
| 5,060,785 A | 10/1991 | Garrity | |
| 5,147,025 A | 9/1992 | Flippo | |
| 5,224,584 A | 7/1993 | Best et al. | |
| 5,256,021 A * | 10/1993 | Wolf et al. | 414/393 |
| 5,307,917 A * | 5/1994 | Hall | 198/313 |
| 5,636,728 A | 6/1997 | Best et al. | |
| 5,685,416 A | 11/1997 | Bonnet | |
| 5,911,300 A * | 6/1999 | Mraz | 198/303 |
| 5,938,004 A * | 8/1999 | Roberts et al. | 198/812 |
| 6,003,658 A * | 12/1999 | Best et al. | 198/588 |
| 6,360,876 B1 * | 3/2002 | Nohl et al. | 198/588 |
| 6,655,893 B2 | 12/2003 | Kelly et al. | |
| 6,915,897 B2 | 7/2005 | Brouwer | |
| 6,929,113 B1 * | 8/2005 | Hoover et al. | 198/812 |
| 7,004,308 B2 | 2/2006 | Parks et al. | |
| 7,156,604 B2 * | 1/2007 | Thogersen | 414/345 |

FOREIGN PATENT DOCUMENTS

SU              1407861       7/1986

* cited by examiner

TELESCOPING CONVEYOR WITH POWERED AND STEERABLE DISCHARGE SECTION

This invention relates to telescoping conveyors that can be expanded, retracted, and steered using a power module and steering assembly.

BACKGROUND OF THE INVENTION

Telescoping conveyors are conventionally used to convey items such as containers of product in warehouses, manufacturing facilities, and other locations. Typically, a warehouse floor has a fixed conveyor distribution system that conveys containers within the warehouse. The warehouse typically has docking stations that trucks can access to load or unload containers. Several docking stations are typically located adjacent to one another along at least one edge of the warehouse floor. The fixed conveyor distribution system and the docking station are typically separated from one another by a distance. The distance is usually too great to manually transport containers across. A telescoping conveyor can be used to convey containers to and from the fixed conveyor distribution system within the warehouse and the truck parked at the docking station. Telescoping conveyor use is not limited to warehouses that service trucks, but can include any situation where items need to be conveyed from one place to another.

It is sometimes desirable to move the conveyor to accommodate the truck's location and to direct the stream of containers to particular portions inside the truck being filled. Conveyors are typically very heavy and difficult to move, however, and workers can experience overexertion, strain, or injury as a result of improper efforts to move the conveyor. In some conveyors, a motor or other power unit can be employed to assist the workers in telescoping the sections of the conveyor, and in some embodiments a steering assembly can be employed to help direct the location of the conveyor.

Telescoping conveyors in the prior art are disclosed in, for instance, U.S. Pat. No. 7,004,308 to Parks et al., which discloses a telescoping conveyor with a single wheel-steering axis and a power module located at an infeed section of the conveyor. Because the power module in the U.S. Pat. No. 7,004,308 is located at the infeed section, the conveyor has decreased traction and cannot adequately overcome ramps or lowered gates that typically extend from the rear of a truck. Also, the steering assembly has the disadvantage of a limited turning radius, which presents an opportunity for the conveyor to tip over. The conveyor disclosed in U.S. Pat. No. 5,685,416 to Bonnet also has a steering assembly with a single wheel-turning axis with the same disadvantages as are present in U.S. Pat. No. 7,004,308 to Parks et al.

SUMMARY OF THE INVENTION

Embodiments of the invention provide a powered and steerable telescoping conveyor. An embodiment can have an infeed section where containers are initially placed, and can also have a discharge section where containers are conveyed from the conveyor. Each section can be provided with a conveying structure, embodiments of which may include wheels, rollers, or belts. Some embodiments have a retracted position where the discharge section is at least partially telescoped underneath the infeed section. Some embodiments have an extended position where the discharge section extends from the infeed section so that containers can be conveyed over the first and second conveying structures.

Embodiments of the conveyor can be telescoped between retracted and extended positions by a power module. In some embodiments the power module can move the entire conveyor, both the infeed and discharge sections, within the warehouse. The power module, which in some embodiments is a motor, can be coupled to wheels on the conveyor. The power module can have at least one control device, and can move the discharge section in a forward direction or in a reverse direction. The power module can also retard the motion of the discharge section. There can be a single power module or multiple power modules. In some embodiments, the power module(s) can be located at a discharge end of the discharge section. In other embodiments, the power module (s) can be located at other positions on the conveyor.

Conveyors according to some embodiments have a steering assembly to position the conveyor. In one embodiment, the steering assembly can have at least two wheels where each has an independent wheel-steering axis. The two independent wheel-steering axes enable the conveyor to be steered at relatively sharp angles with a limited chance of tipping over. Also, in some embodiments power modules can be mounted on each of the independent wheel-steering axes.

In certain embodiments, the entire conveyor can be portable.

It is accordingly an object of some embodiments of the invention to provide a conveyor for conveying containers.

It is an additional object of some embodiments of the invention to provide a conveyor that can be telescoped or steered by one person.

It is a further object of some embodiments of the invention to provide a conveyor with a power module to telescope the conveyor between retracted and extended positions.

It is a further object of some embodiments of the invention to provide a conveyor with an improved steering assembly having two independent wheel-steering axes.

Other objects, features, and advantages of embodiments of the invention will become apparent with respect to the remainder of this document.

GENERAL DESCRIPTION OF THE DRAWINGS

DETAILED DESCRIPTION OF THE DRAWINGS

Figure 1:
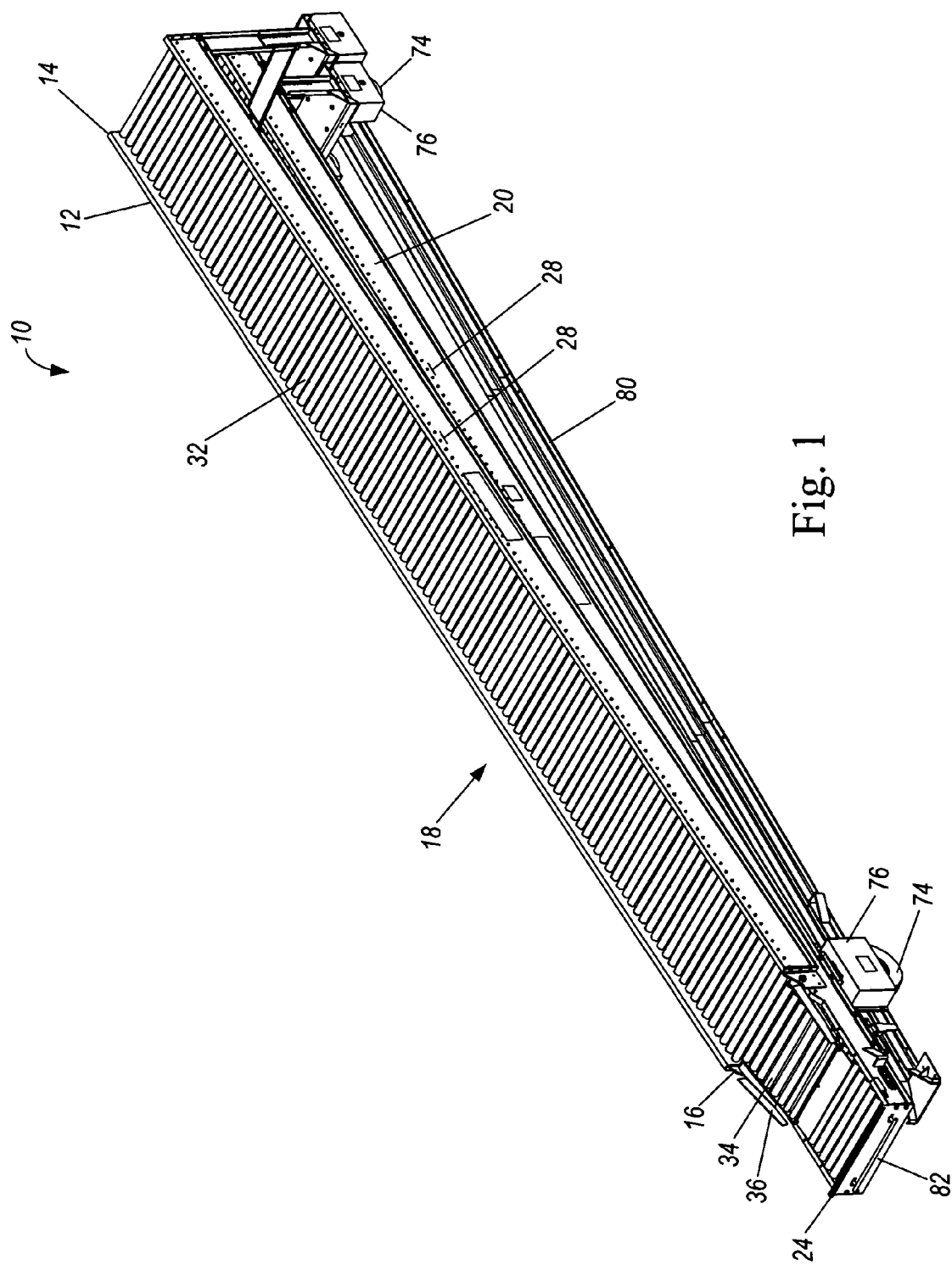
FIG. 1 shows an isometric view of a conveyor according to an embodiment of the invention, where the conveyor is in a retracted position.
Figure 2:
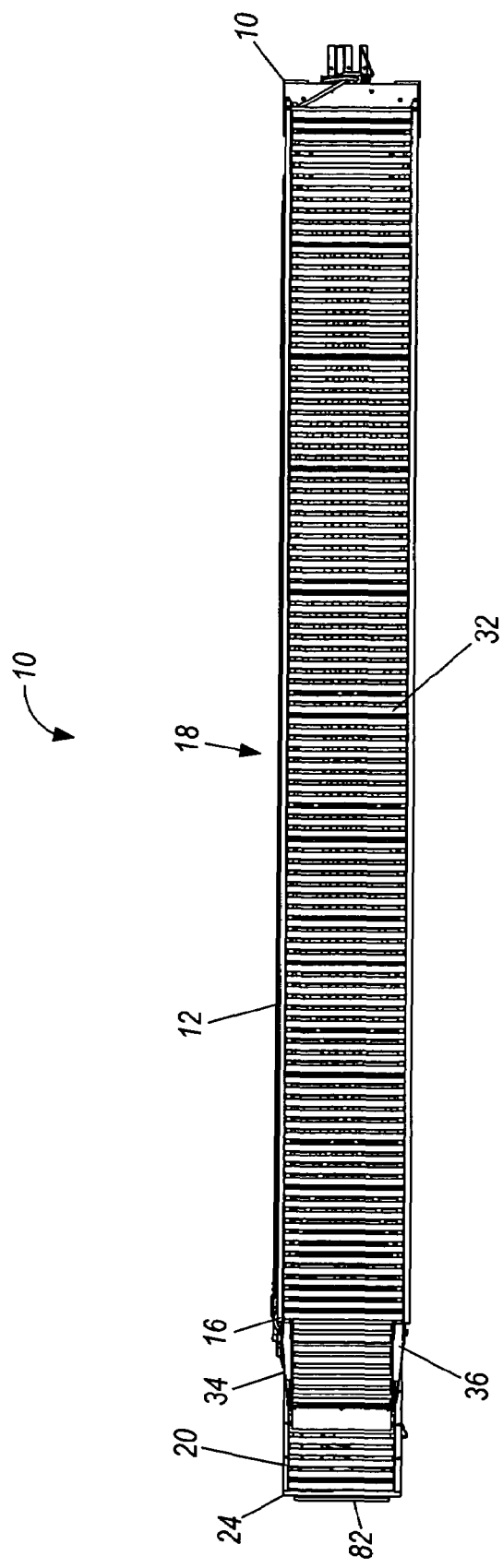
FIG. 2 shows a top plan view of the conveyor of FIG. 1.
Figure 3:
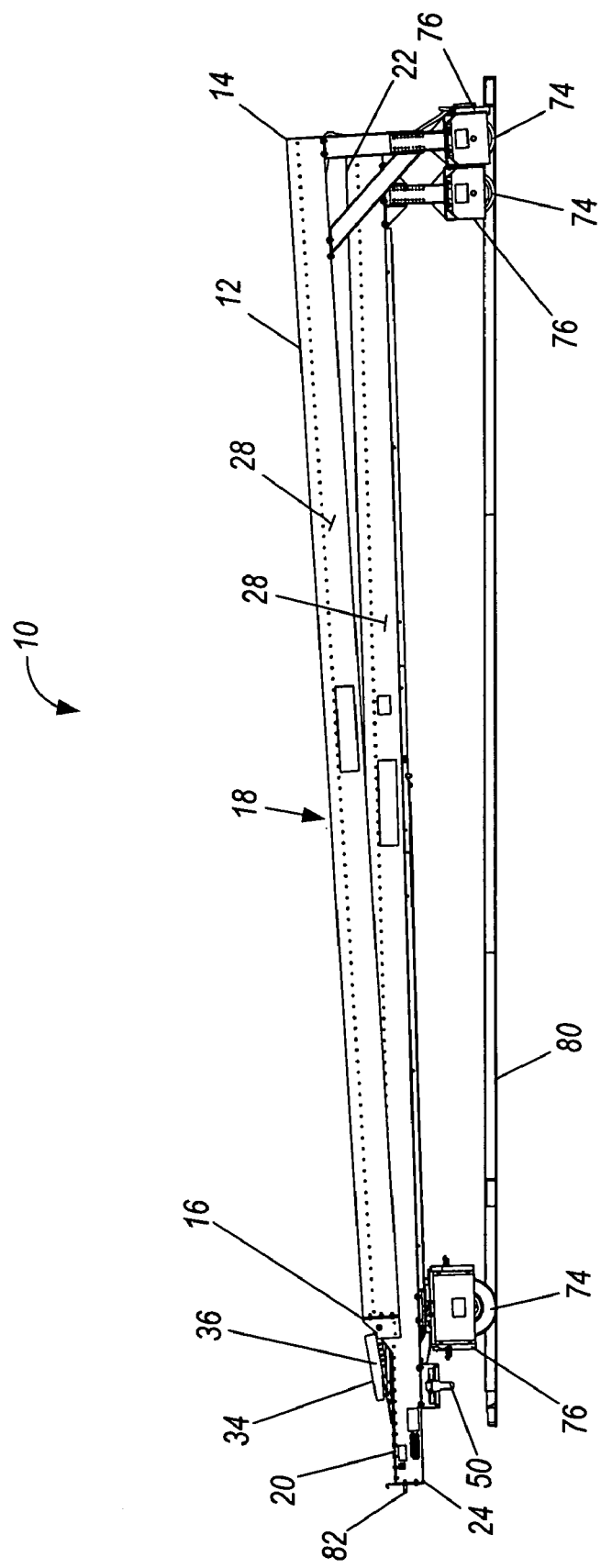
FIG. 3 shows a left side view of the conveyor of FIG. 1.
Figure 4:
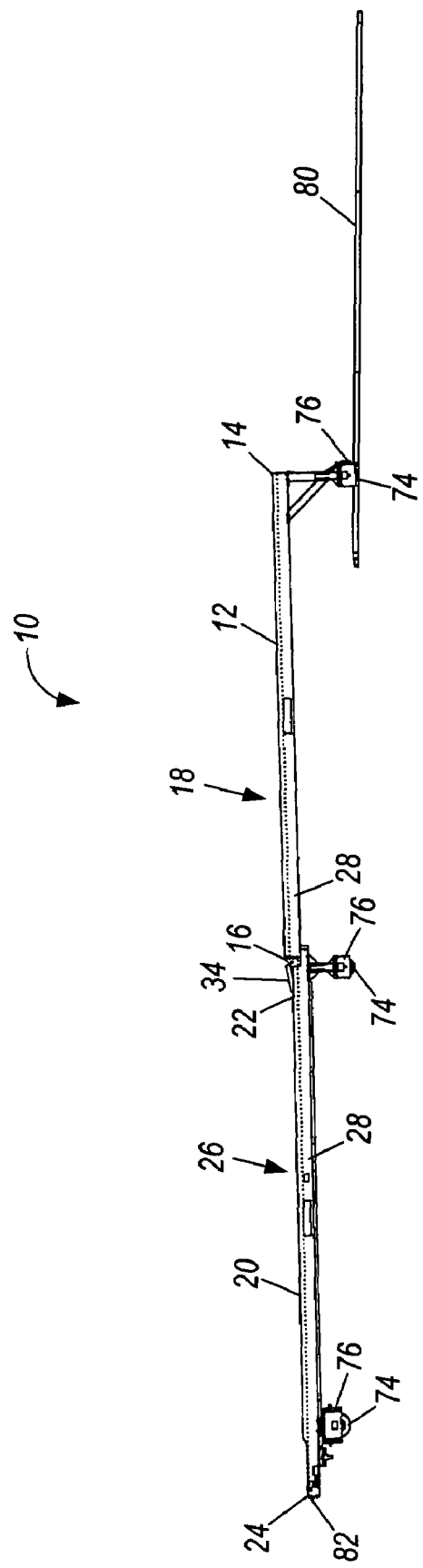
FIG. 4 shows a left side view of a conveyor according to another embodiment of the invention, where the conveyor is in an extended position.

FIG. 1 shows a telescoping conveyor 10 according to an embodiment of the invention. In this embodiment, the conveyor 10 has an infeed section 12 and a discharge section 20. The infeed section 12 can be configured to enable the discharge section 20 to be telescoped beneath the infeed section 12 in a retracted position. For example, in the embodiment shown in FIGS. 1-3, the infeed section 12 has a greater height and width than the discharge section 20 to accommodate the retracted position. The conveyor 10 takes up less longitudinal space in the retracted position than in the extended position. Accordingly, it may be desirable to maintain the conveyor 10 in the retracted position while the conveyor 10 is not in use and it is desired to save space. On the other hand, containers can still be conveyed over only the infeed section 12 while conveyor 10 is retracted. Maintaining the conveyor 10 in a retracted position might be desirable if there is only a small space between the truck docking bay and the fixed conveyor distribution system within the warehouse. While FIGS. 1-3 show the conveyor 10 in a completely retracted position and FIG. 4 shows a completely extended position, the conveyor 10 can be retracted and extended to varying degrees. For example, the conveyor 10 could only be extended to half its potential extended position.

In some embodiments of the invention, each of the infeed and discharge sections 12, 20 can have an elongated frame 28. The frame 28 can be made of steel or another suitable metal and can be assembled with techniques known in the art. The infeed and discharge sections 12, 20 can have an associated first and second conveying structures, 18, 26 respectfully. The frame 28 can have cross bars 30 located beneath the conveying structures 18, 26 to provide support as containers are being conveyed over the conveying structures 18, 26. In the embodiment illustrated in the figures, the conveying structures 18, 26 are inclined and include elongated rollers 32. In this embodiment, containers can be conveyed down the first and second conveying structures 18, 26 by gravity. In another embodiment, the first and second conveying structures 18, 26 can have skate wheels (not shown). In yet another embodiment the conveying structures 18, 26 can be generally flat and can include belts, and the belts can be driven by a power source (not shown). The rollers 32 and/or skate wheels can also be driven by a power source. Embodiments of the invention can include various combinations of elongated rollers 32, skate wheels, and/or belts on the same conveying structure 18, 26.

In some embodiments, such as in FIG. 4, a small step can be created between the infeed and discharge sections 12, 20 when in the conveyor 10 is in the extended position. Items that are conveyed over the step could be damaged when they drop onto the discharge section 20. Accordingly, in one embodiment of the invention, the first conveying structure 18 can have a portion 34 that overlaps the second conveying structure 26 when the conveyor 10 is in the extended position. The portion 34 creates an inclined structure over which containers can be conveyed without damaging the containers. As shown in the figures, the portion 34 can have rollers, but can also be provided with wheels or a belt. Also, in some embodiments the portion 34 can have a frame 36 that is generally angled towards the frame 28 of the discharge section 20. The frame 36 of the portion 34 can thus act as a funnel, conveying containers from the wider first conveying structure 18 to the more narrow second conveying structure 26.

Embodiments of the conveyor 10 can include a power module 40 that can move the discharge section 20 relative to the infeed section 12, for example, between the extended and retracted positions. Embodiments of the conveyor 10 can also have power modules 40 that can move both of the infeed and discharge sections 12, 20 within the warehouse. A power module 40 can reduce the likelihood that a worker will be injured as he/she is operating the conveyor 10. In one embodiment, the power module 40 is a direct-current gear motor manufactured by Baldor, but any suitable power generating device can be used in embodiments of the invention. If a motor is used, a gear or chain reduction can also be provided with the motor, if desired. Certain embodiments may have a single power module 40, but other embodiments can have multiple power modules 40. For example, FIGS. 5-9 show power modules 40 located on each of the two wheels 74 on the discharge section 20.

Embodiments of the invention provide for power modules 40 located at various positions on the conveyor 10. In one embodiment, the power module 40 is located near the discharge end 24 of the discharge section 20, which provides improved traction over conveyors in the prior art. A relatively high amount of traction between the wheels 74 and the floor is necessary when the conveyor 10 must move over small steps or ledges. For example, dock plates or ramps that hinge from the rear of a truck create a small ledge that the conveyor 10 must overcome. Prior art conveyors have power modules located on the infeed end of the discharge section, or somewhere on the infeed section. These prior art conveyors do not provide sufficient traction to allow the prior art conveyor to overcome the ledge. An embodiment of the claimed invention provides improved traction because the power module 40 can be located near the discharge end 24 of the discharge section 20. Embodiments of the invention are not limited to a power module 40 in this location, however. In another embodiment, the power module 40 can be located near the infeed end 22 of the discharge section 20, or at any point along the infeed section 12.

Figure 10:
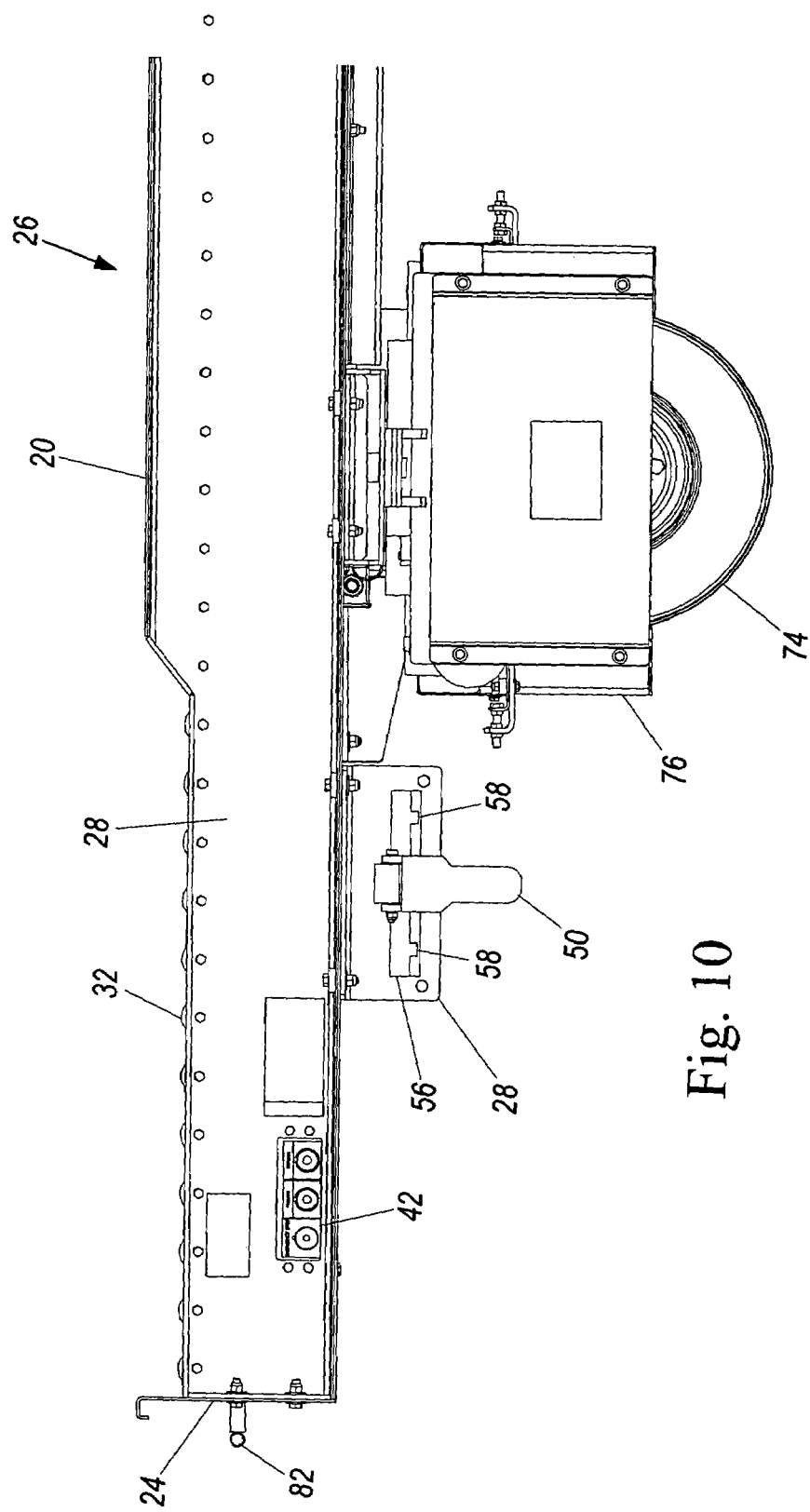
FIG. 10 shows a partial left side view of the conveyor of FIG. 1.

In conveyors 10 according to some embodiments, the power module 40 can be controlled by a control device 42 as shown in FIG. 10. When the control device 42 is activated, the power module 40 receives power and moves the conveyor 10. In one embodiment, the control device 42 can provide forward and reverse directions. In other embodiments, the control device 42 could provide for only a single direction, either forward or reverse. When the control device 42 is deactivated, the power module 40 stops receiving power. If the conveyor 10 has been provided with a motor having a gear reduction, the gear reduction can dissipate any power remaining in the motor, and can dynamically stop or brake the discharge section 20. If there are two power modules 40 on the conveyor 10, then each power module 40 could be controlled independently of the other power module 40. Providing independent control of the power modules 40 enables the user to direct more or less power to one of the power modules 40. Accordingly, if the conveyor 10 has been provided with two wheels 74, each having an independently controlled power module 40, then the user could direct more or less power to one of the wheels 74. Such an embodiment might be useful if one wheel 74 had to overcome a particularly large ledge or dock plate.

FIG. 10 shows a steering selector 50 that can be used in some embodiments of the invention. The steering selector 50 can have an arm 52 with a protrusion 54 extending from one side of the arm 52. The frame 28 can define a cutout 56 with a number of recesses 58, 60 and the protrusion 54 of the steering selector 50 can engage with the recesses 58, 60. The recesses 58, 60 can be configured to allow a user to select a steering angle. In the embodiment shown, the steering selector 50 is moved between recesses 58, 60 manually by the operator. In another embodiment, however, the steering selector 50 could include an electric linear actuator (not shown) to power the steering selector 50 to move between recesses 58, 60.

In some embodiments, there can be a center recess 60 that can enable the discharge section 20 to be steered in a straight direction, and there can be recesses 58 on each side of the center recess 60 that can enable the discharge section 20 to be steered at an angle to the infeed section 12. In the embodiment shown in the figures, there is only one pair of recesses 58 that steer the discharge section 20 at approximately 7° relative to the infeed section 12. In other embodiments, however, there could be additional pairs of recesses 58, or recesses 58 located at different points on the cutout 56 to provide a variety of steering angles. There could also be provided only a single recess 58 on one side of the center recess 60 without a matching pair.

Figure 5:
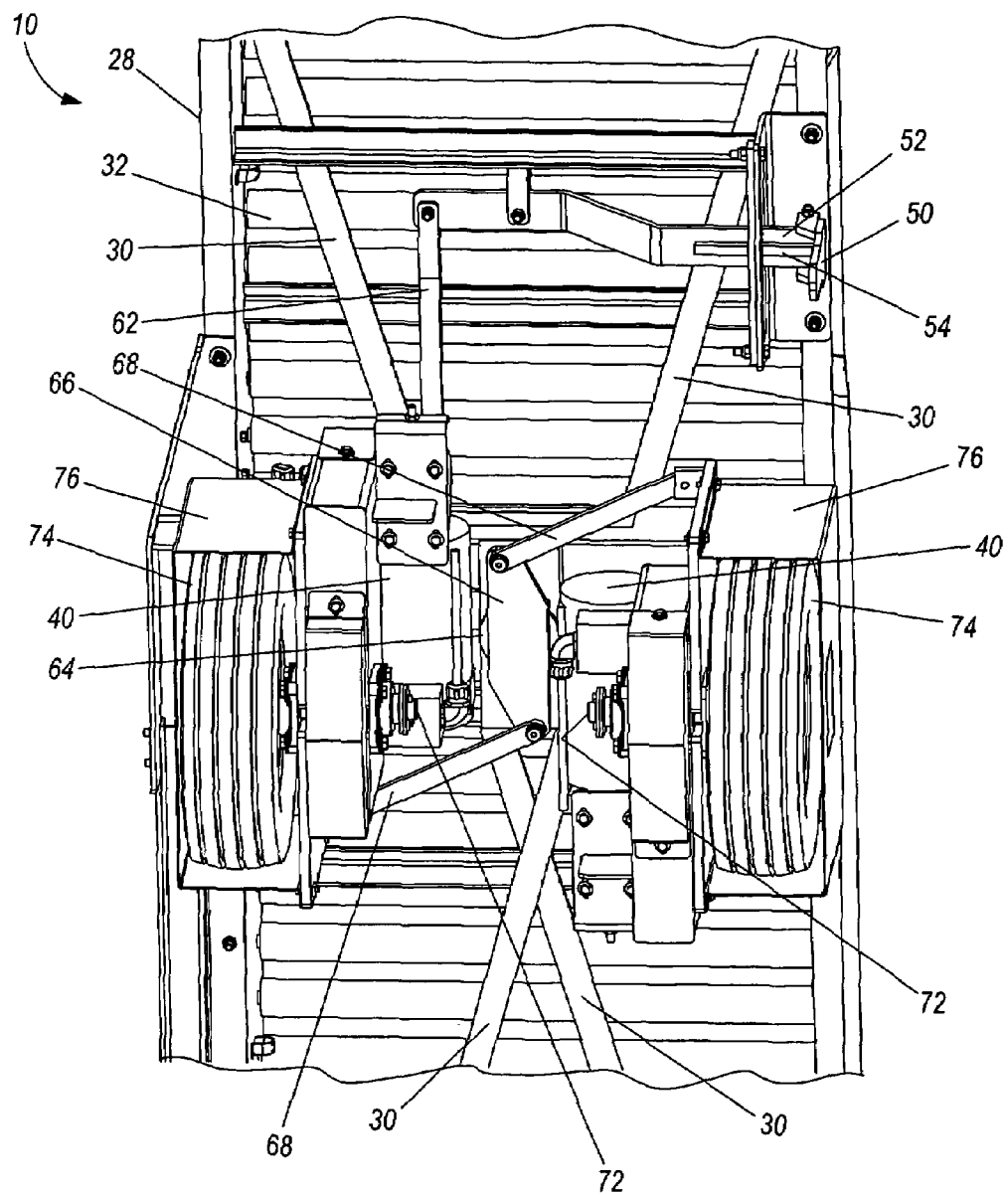
FIG. 5 shows a partial bottom view a conveyor according to one embodiment of the invention.
Figure 6:
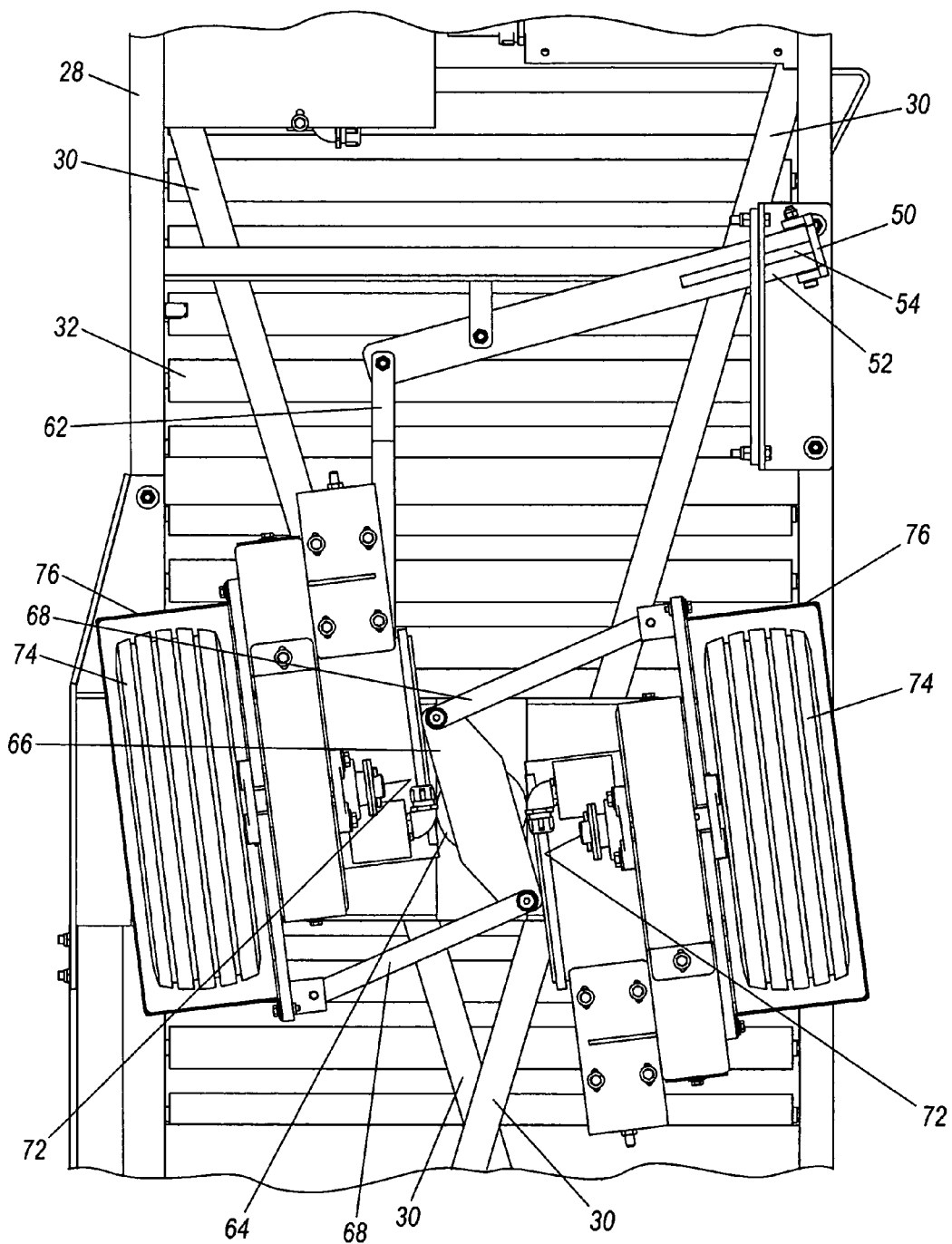
FIG. 6 shows the conveyor of FIG. 5 with the wheels in a angled direction.
Figure 7:
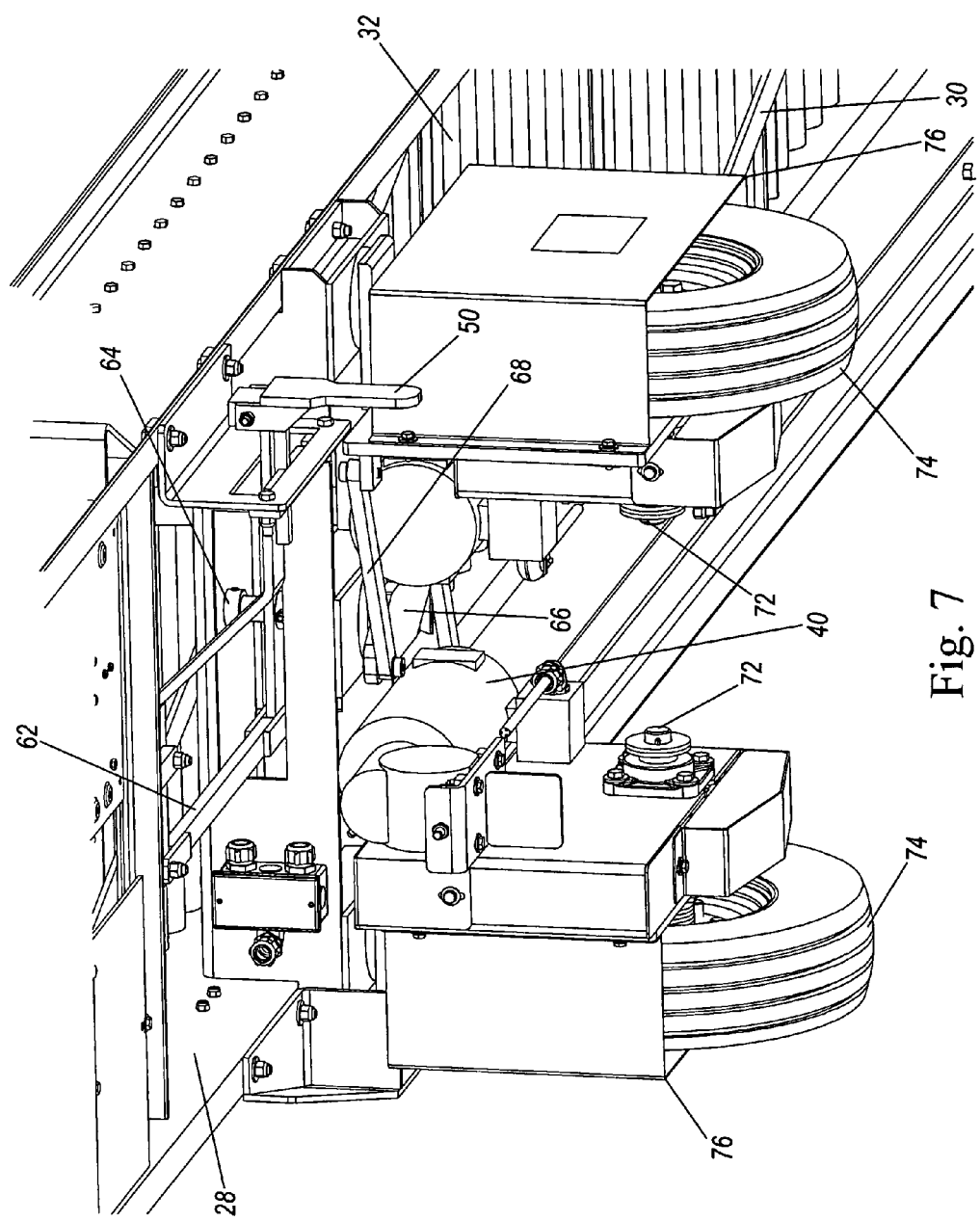
FIG. 7 shows an isometric partial view of the steering assembly of FIG. 5.
Figure 8:
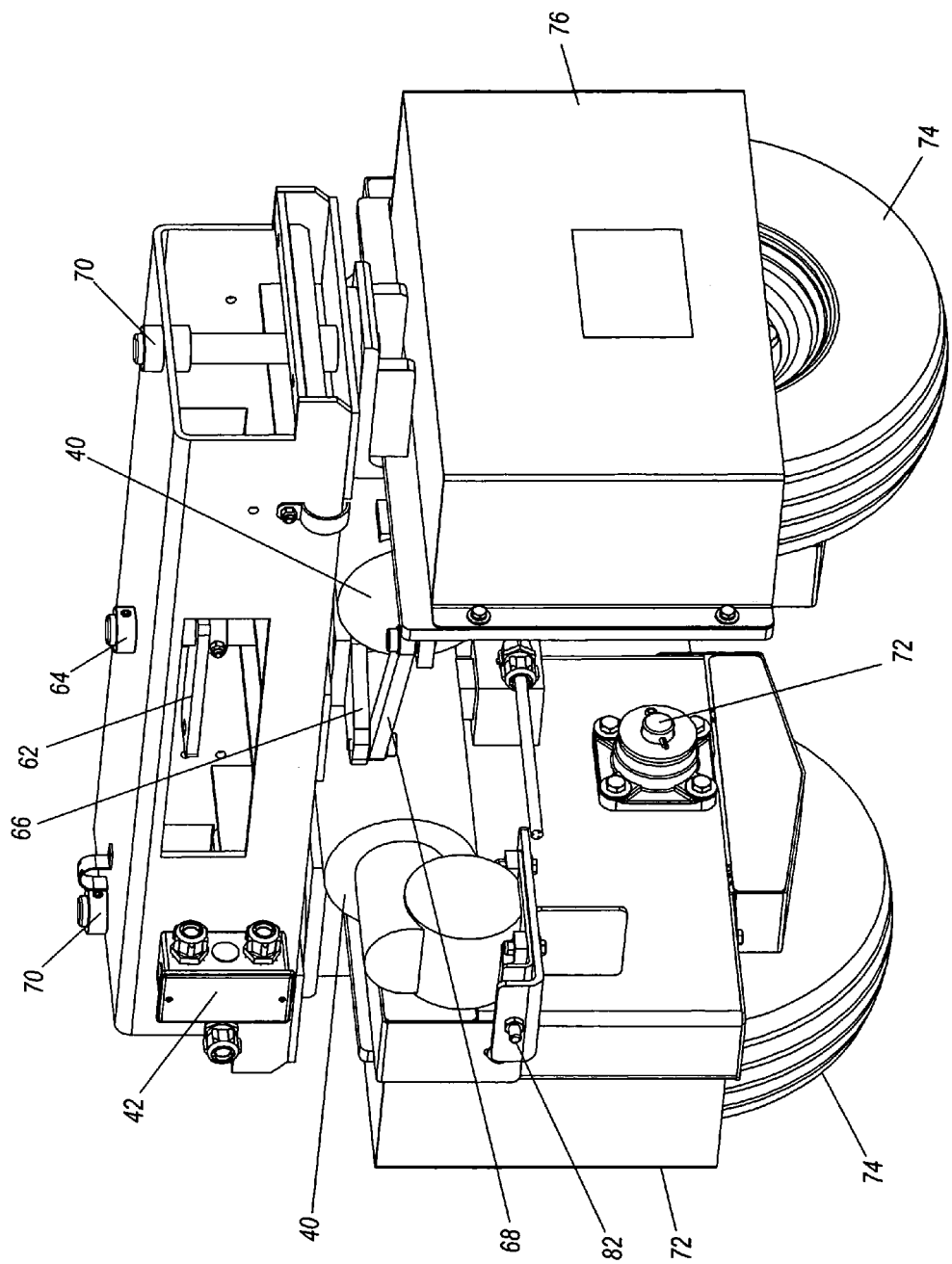
FIG. 8 shows an isometric partial view of the steering assembly of FIG. 5, with the first conveyor structure removed.
Figure 9:
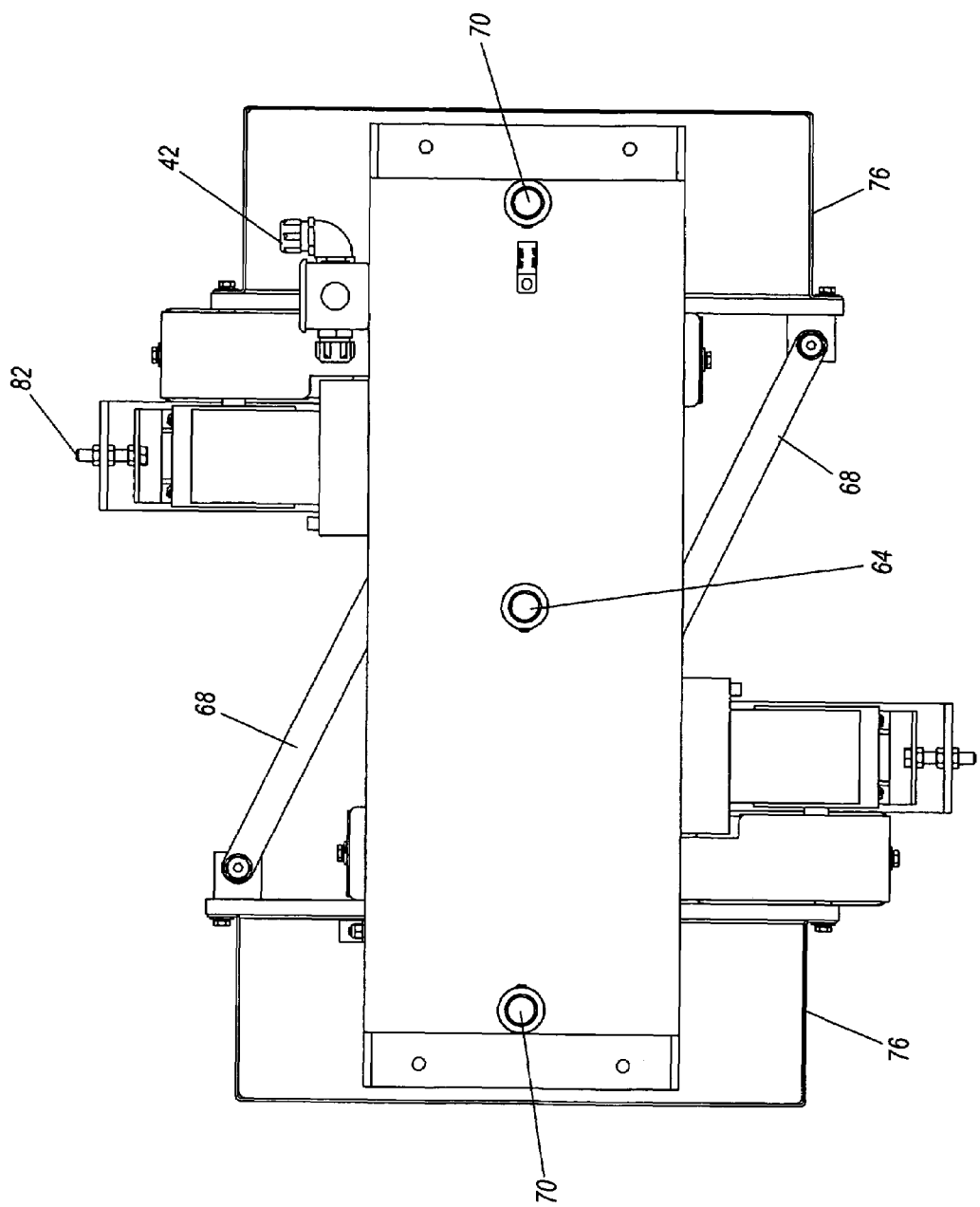
FIG. 9 shows a top view of the conveyor of FIG. 8.

FIGS. 5 through 9 illustrate a steering assembly according to one embodiment of this invention. The assembly can include the steering selector 50, steering selector linkage 62, a pivot axis 64, a wheel-steering plate 66, at least one wheel-steering linkage 68, at least one wheel-steering axis 70, at least one axle 72, at least one wheel 74, and at least one wheel housing 76. FIG. 5 shows the steering selector 50 in the center recess 60 so that the discharge section 20 is pointed generally straight. When an operator selects a steering angle, the members of the steering selector linkage 62 can pivot to transmit the angle to the pivot axis 64. The pivot axis 64 can then pivot to transmit the angle to the wheel-steering plate 66, which in turn can pivot the members of the wheel-steering linkages 68. In the embodiment shown, each wheel-steering linkage 68 can pivot at the coupling with the wheel-steering plate 66 and the wheel housing 76. When the wheel-steering linkages 68 pivot, each wheel 74 is caused to pivot on its axle 72 about the wheel-steering axis 70. The wheel-steering axis 70 is the point about which the axle 72 can pivot, and is best illustrated in FIGS. 8 and 9. In this embodiment, each wheel 74 has its own axle 72 and its own independent wheel-steering axis 70. Other linkages and mechanisms can be used to implement other embodiments of steering assemblies with independent wheel-steering axes 70.

Figure 11:
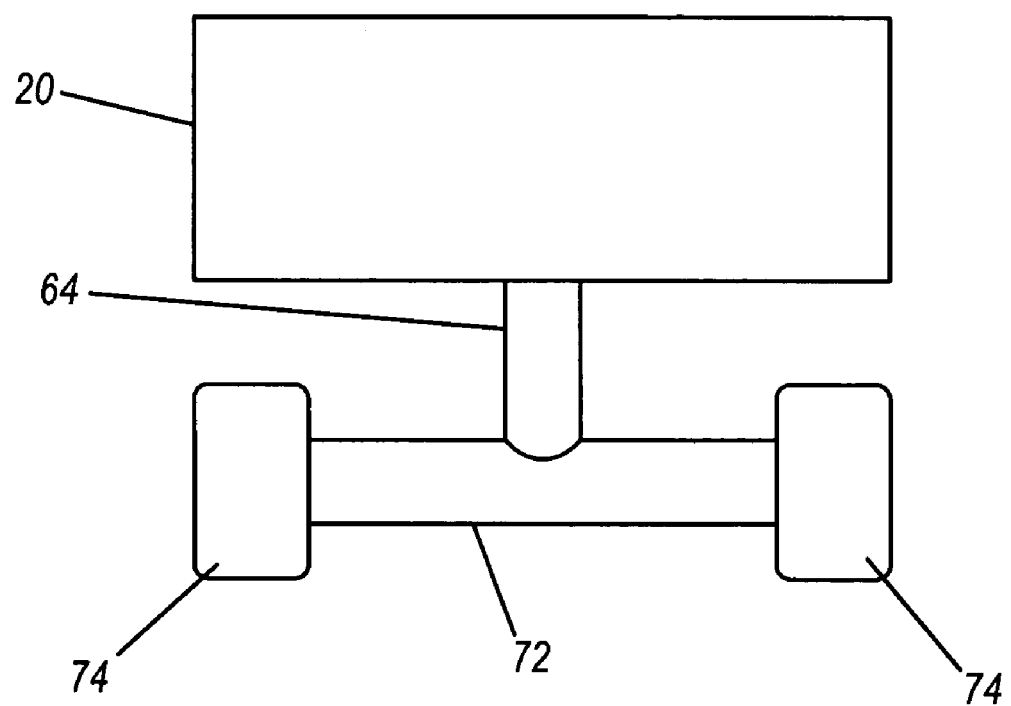
FIG. 11 shows a partial front view of a conveyor according to an alternate embodiment of the invention.

In another embodiment, the conveyor 10 can have wheels 74 with a single axle 72 and a single wheel-steering axis 70, as shown in FIG. 11. In this embodiment, the pivot axis 64 is coupled to the single axle 72. When an operator selects a steering angle, the steering selector linkage 62 can pivot to transmit the angle to the pivot axis 64, which pivots the axle 72 and the wheels 74. There is only a single wheel-steering axis 70, which coincides with the pivot axis 64.

Figure 12:
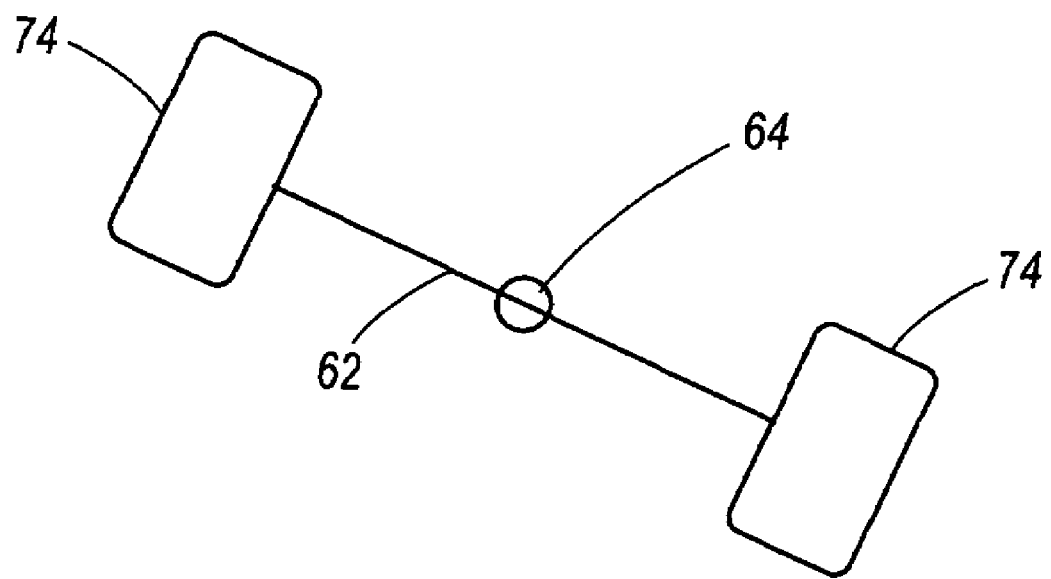
FIG. 12 shows the steering pattern of the embodiment of the conveyor shown in FIG. 11.
Figure 13:
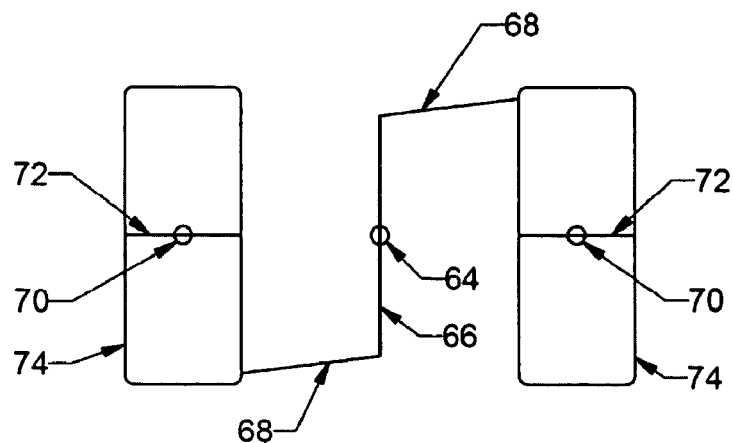
FIG. 13 shows the steering pattern of the embodiment of the conveyor shown in FIGS. 5-9.
Figure 13:
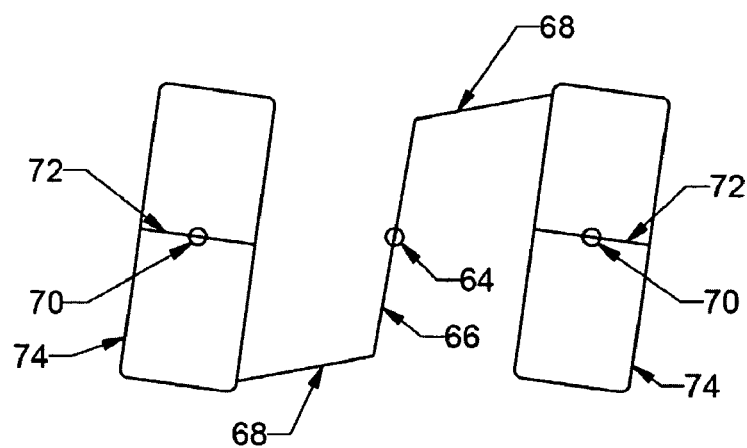
Figure 13:
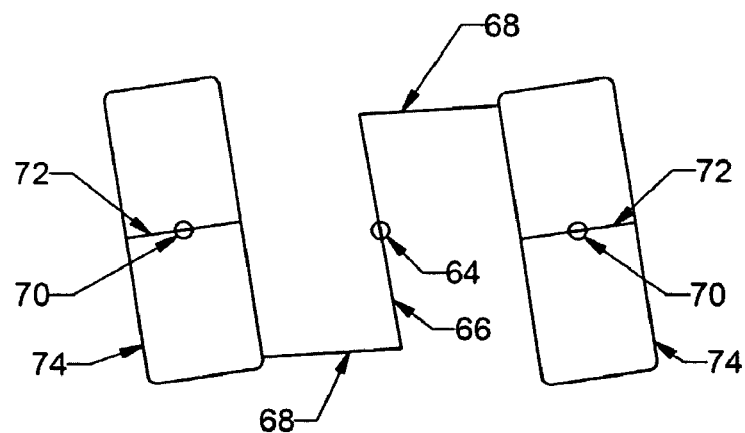

The embodiment with independent wheel-steering axes 70 as shown in FIGS. 5 through 9 is generally preferred because it provides greater control and safety than the embodiment with a single wheel-steering axis 70 as shown in FIG. 11. Independent wheel-steering axes 70 give the wheels 74 greater traction to overcome ledges. Also, a conveyor 10 with independent wheel-steering axes 70 has a broader turning base than a conveyor 10 with a single axis 70. FIGS. 12 and 13 show two embodiments of conveyor 10 completing a turn. FIG. 12 shows an embodiment with a single wheel-steering axis 70, and FIG. 13 shows an embodiment with two independent wheel-steering axes 70. As the embodiment in FIG. 12 turns, the turning base becomes very narrow and if steered too sharply, the conveyor 10 could flip over. On the other hand, the embodiment in FIG. 13 has a broader turning base, which reduces the likelihood that the conveyor 10 will flip over.

In the embodiment shown in the figures, the infeed and discharge sections 12, 20 each have at least one pair of wheels 74. The wheels 74 enable the entire conveyor 10, both the infeed and discharge sections 12, 20, to be portable, either within the warehouse or outside the warehouse. It may be desirable to move the conveyor 10 outside the warehouse if the conveyor 10 requires repair or replacement. It may be desirable to move the conveyor 10 within the warehouse between different docking stations. In some embodiments, the conveyor can be fixed to the warehouse floor, or to another stable structure within the warehouse. The conveyor 10 can be fixed with bolts, restraining straps, or the like. When it is desired to move the conveyor 10, the bolts or other restraints can be removed, and the conveyor 10 can be wheeled away on the pairs of wheels 74.

Embodiments of the conveyor 10 can also be provided with a guide rail 80, guide pins (not shown), and stops (not shown) that maintain the conveyor 10 in an appropriate position within the warehouse. In the embodiment shown in the figures, the guide rail 80 is fixed to the warehouse floor but in other embodiments the guide rail 80 can be elevated a distance off of the warehouse floor, mounted to a structure beside the conveyor 10, or another similar embodiment. One end of the guide rail 80 can be located near the fixed conveyor distribution system within the warehouse, and the other end of the guide rail 80 can lead to the docking bay. Guide pins (not shown) can extend from the infeed and discharge sections 12, 20 to engage with the guide rail 80. The guide rail 80 and guide pins help to ensure that the conveyor 10 does not become separated from or misaligned with the fixed conveyor distribution system within the warehouse. The stops can prevent the conveyor 10 from extending to undesirable positions.

Certain embodiments can be operated as follows. A truck or other receptacle can be positioned at the loading dock, and a dock plate can be used to connect the back of the truck to the loading dock. The infeed end 14 of the infeed section 12 can be positioned near the fixed conveyor distribution system within the warehouse. It may be desirable to position a spur conveyor (not shown) to connect the edge of the fixed conveyor distribution system to the infeed end 14 of the infeed section 12. A spur conveyor is typically around 5 feet long, and can have a conveying structure comprising rollers, wheels, or belts. A user can operate the control device 42 and the steering selector 50 to move the conveyor 10. In one embodiment, the entire conveyor 10, including both the infeed and discharge sections 12, 20, can be moved away from the fixed conveyor distribution system and closer to the truck. If the embodiment has a guide rail 80 with a stop, then the stop can prevent the infeed section 12 from any further movement, but the stop can allow the discharge section 20 to continue moving towards the truck. The discharge section 20 can continue moving until it reaches the fully extended position, or until the control device 42 stops delivering power to the motor 40. In another embodiment, the infeed section 12 can remain stationary and only the discharge section 20 can be moved towards the truck. In this embodiment, the discharge section 20 can continue moving until it reaches the fully extended position, or until the control device 42 stops delivering power to the motor 40. In yet another embodiment, the infeed section 10 can move and the discharge section 20 can remain stationary. Embodiments of the conveyor allow either the infeed or discharge section, 12, 20, or both, to move. Embodiments of the invention can also include a bumper bar 82, which acts as a safety device. As shown in the embodiments in the figures, the bumper bar 82 can be generally located near the discharge end 24 of the discharge section 20. The bumper bar 82 is shown as an elongated bar, but could also be embodied as a push button, or as a series of push buttons. If the conveyor 10 is being moved and the bumper bar 82 comes into contact with an immovable object, such as the side of the truck, the bumper bar 82 is depressed or otherwise activated and can cause the power module 40 to stop delivering power to the conveyor 10. When the power supply is terminated, the conveyor 10 stops moving. Thus the bumper bar 82 can act as a safety device to prevent damage to the conveyor 10 caused by contact with immovable objects.

The foregoing is provided for purposes of illustration and disclosure of a preferred embodiment of the invention. Changes, deletions, additions, and modifications may be made to the structures disclosed above without departing from the scope or spirit of the present invention.

The invention claimed is:

1. A telescoping conveyor comprising:
   (a) an infeed section defining a first conveying structure;
   (b) a discharge section having a discharge end and defining a second conveying structure, the discharge section having a refracted position where the infeed and discharge sections are at least partially telescoped;
   (c) at least one power module adapted to move at least one of the discharge section or the infeed section relative to the other; and
   (d) a steering assembly adapted to steer the conveyor, the steering assembly located at approximately the discharge end of the discharge section, comprising a first wheel with a first wheel-steering axis and at least a second wheel with a second wheel-steering axis, where the first wheel-steering axis is different than the second wheel-steering axis, and a pivot axis that links the first wheel-steering axis and the second wheel-steering axis.

2. The conveyor of claim 1, the at least one power module located near at least one of the discharge end of the discharge section, an infeed end of the discharge section, an infeed end or the infeed section, or a discharge end of the infeed section.

3. The conveyor of claim 1, the first and second conveying structure comprising at least one of belts, wheels, or rollers.

4. The conveyor of claim 1, wherein the power module is adapted to move both of the infeed section and the discharge section.

5. The conveyor of claim 1, wherein the conveyor is portable.

6. The conveyor of claim 1, the first conveying structure further comprising a portion that overlaps the infeed end of the discharge section when the conveyor is in an extended position.

7. The conveyor of claim 1, further comprising guide pins extending from the conveyor, the guide pins adapted to engage with a guide rail.

8. The conveyor of claim 1, further comprising a bumper bar to at least partially retard the motion of the conveyor.

9. A telescoping conveyor comprising:
   (a) an infeed section defining a first inclined structure;
   (b) a discharge section defining a second inclined structure, the discharge section having a lower end and a retracted position where the infeed section and discharge section are at least partially telescoped;
   (c) at least one power module located at approximately the lower end of the discharge section, the at least one power module adapted to move at least one of the discharge section or the infeed section relative to the other; and
   (d) a steering assembly located at approximately the lower end of the discharge section and adapted to steer the conveyor, comprising a first wheel with a first axle a second wheel with a second axle and a pivot axis that links the first axle and the second axle.

10. The conveyor of claim 9, the steering assembly comprising at least two wheels and at least one power module associated with each wheel.

11. The conveyor of claim 9, the first and second inclined structure comprising at least one of belts, skate wheels, or rollers.

12. The conveyor of claim 9, the first inclined structure further comprising a portion that overlaps an upper end of the second inclined structure when the conveyor is in an extended position.

13. The conveyor of claim 9, further comprising guide pins extending from the conveyor, the guide pins adapted to engage with a guide rail.

14. A telescoping conveyor comprising:
   (a) an infeed section defining a first conveying structure;
   (b) a discharge section defining a second conveying structure, the discharge section having a retracted position where the first and second conveying structures are at least partially telescoped; and
   (c) a power assembly adapted move at least one of the discharge section or the inked section relative to the other, the power assembly comprising a first wheel with a first wheel-steering axis, at least a second wheel with a second wheel-steering axis, where the first wheel-steering axis is different than the second wheel-steering axis, and a power module associated with each wheel.

15. The conveyor of claim 14, the first and second conveying structure comprising at least one of belts, wheels, or rollers.

16. The conveyor of claim 14, the power assembly further comprising a control device adapted to independently control each power module.

17. The conveyor of claim 14, further comprising guide pins extending from the conveyor, the guide pins adapted to engage with a guide rail.

18. The conveyor of claim 14, the first conveying structure further comprising a portion that overlaps an in feed end of the discharge section when the conveyor is in an extended position.

19. The conveyor of claim 14, further comprising a bumper bar at least partially retard the motion of the conveyor.

20. The conveyor of claim 14, wherein the power assembly is adapted to move both of the infeed section and the discharge section.

* * * * *